United States Patent

[11] 3,597,580

| [72] | Inventors | James B. Stearns<br>Elm Grove;<br>Robert W. Wendelburg, Milwaukee, both of, Wis. |
|---|---|---|
| [21] | Appl. No. | 819,175 |
| [22] | Filed | Apr. 25, 1969 |
| [45] | Patented | Aug. 3, 1971 |
| [73] | Assignee | Chemetron Corporation<br>Chicago, Ill. |

[54] CONTROLLED RECTIFIER ARC WELDING SUPPLY HAVING IMPROVED POSITIVE FIRING CHARACTERISTICS
7 Claims, 2 Drawing Figs.

[52] U.S. Cl............................................................ 219/135, 219/131
[51] Int. Cl............................................................ B23k 9/10
[50] Field of Search............................................ 219/130, 131, 135, 137; 307/246, 301; 315/144; 321/22

[56] References Cited
UNITED STATES PATENTS

| 3,337,769 | 8/1967 | Buchanan................... | 315/144 X |
| 3,346,799 | 10/1967 | Aldenhoff.................... | 307/301 X |
| 3,371,242 | 2/1968 | Aldenhoff et al............. | 219/135 X |

Primary Examiner—J. V. Truhe
Assistant Examiner—C. L. Albritton
Attorney—James E. Nilles ABSTRACT: A three phase transformer and a full wave rectifier unit including silicon controlled power rectifiers. A feedback control system includes a pair of separate and cascaded summing differential amplifiers to control the firing circuits for the related pairs of rectifiers. Each firing circuit includes a unijunction transistor oscillator having a gate circuit including a small trim potentiometer for adjusting the pulse time. A capacitor in series with a resistor is connected in parallel with the oscillator to a bridge rectifier. A silicon controlled rectifier in series with a resistor is connected across the capacitor to form a firing pulse for the related pair of power rectifiers.

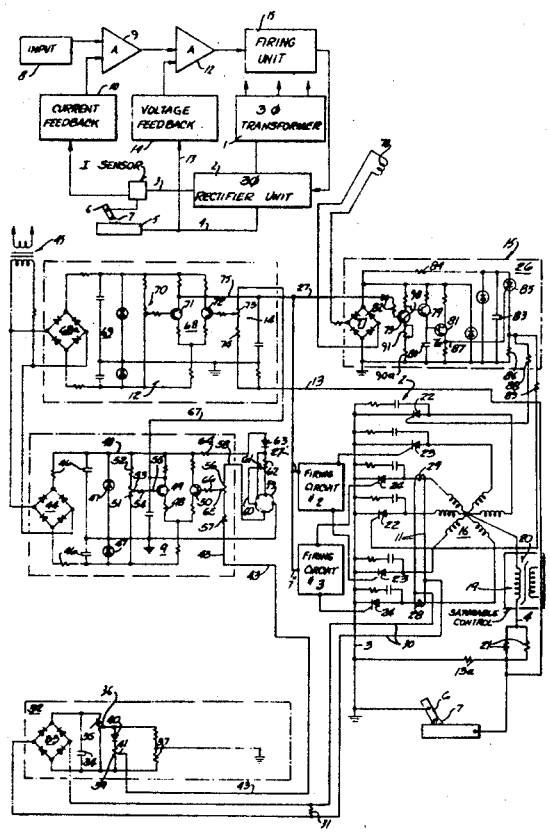

PATENTED AUG 3 1971

INVENTORS:
JAMES B. STEARNS
ROBERT W. WENDELBURG
BY:
James E. Nilles
ATTORNEY

CONTROLLED RECTIFIER ARC WELDING SUPPLY HAVING IMPROVED POSITIVE FIRING CHARACTERISTICS

BACKGROUND OF THE INVENTION

This invention relates to controlled rectifier arc welding supply having an improved positive rectifier firing circuit for establishing and maintaining an arc between a pair of spaced electrodes, for example, as in arc welding.

Direct current power supplies for establishing and maintaining of an arc between a pair of electrodes generally may employ a transformer reducing the incoming line voltage, with the output of the transformer full wave rectified for establishing a suitable direct current voltage and current output. A highly satisfactory arc welding power supply is disclosed in U.S. Pat. No. 3,337,769 wherein a polyphase transformer-rectifier system is disclosed having current and voltage feedback control for determining the desired phasing or firing of silicon controlled rectifiers forming a full wave triggered rectification means. Individual firing circuits are provided for each pair of phase related controlled rectifiers. Each firing circuit includes a unijunction transistor oscillator having a pulse transformer in the emitter circuit of the unijunction transistor for firing of a related pair of controlled rectifiers.

Although the above circuit provides a satisfactory arc power supply, unexplainable missed firing of the controlled rectifiers have been encountered and the adjustment to maintain balanced current paths was cumbersome and somewhat hazardous under operating conditions.

In the above identified patent, the power rectifiers are thus fired from the unijunction transistor oscillator with the particular time of firing controlled by the feedback signal. Controlled rectifiers are generally quite load current sensitive and because of the substantial currents involved in arc welding and the like, adjustment of the several parallel paths to insure equal load current distribution between the several parallel paths is of substantial significance. In the above Buchanan circuit, for example, a variable resistor is shown for adjusting the several current paths.

SUMMARY OF THE INVENTION

The present invention is particularly directed to an improved firing circuit for controlling controlled rectifiers and the like in an arc power supply with means establishing reliable firing and permitting convenient adjustment of the firing point. Generally, in accordance with the present invention, the unijunction transistor pulse forming network or circuit is provided with an additional output pulse amplifying section interposed between the unijunction pulse forming network and the silicon controlled rectifiers. A charge storage capacitor is connected through a charging resistor to the unijunction pulse forming power supply and in parallel with the unijunction circuitry. A small pilot triggered switch, such as a silicon controlled rectifier, is connected in series with a resistor across the capacitor. The input means to the pilot switch is connected to the output of the unijunction transistor circuit. Thus, when the unijunction transistor fires to establish a pulse signal, the triggered switch means conducts. This connects the signal resistor directly across the capacitor which discharges rapidly therethrough establishing a relatively high voltage, short duration pulse. The signal resistor is connected to the gates of the related main controlled rectifiers. The energy of the storage capacitor establishes a hard firing pulse and essentially eliminates $di/dt$ failure associated with controlled rectifiers operating at high current levels. In addition, the circuit has been further improved by revising the unijunction circuitry to employ a small trim potentiometer in series with a fixed resistor to vary the firing point of the respective phase firing controls. The trim potentiometer may be readily adjusted with a screwdriver or the like. Furthermore, the firing circuit may be formed as a printed circuit board member including essentially the control components such that the trim potentiometer can be safely adjusted under machine operating conditions.

The present invention has been found to provide improved and reliable firing of the controlled rectifiers under the large welding currents employed for arc welding both because of the hard pulse firing and the convenient mode of adjusting the relative phase of firing of the three circuits to maintain the necessary equal current division between the paralelled rectifying paths.

BRIEF DESCRIPTION OF THE DRAWING

FIG. 1 is a block diagram of the power supply and control circuitry for an arc welding system constructed in accordance with the present invention; and FIG. 2 is a schematic circuit diagram illustrating the preferred construction of the present invention shown in FIG. 1.

DESCRIPTION OF A PREFERRED EMBODIMENT

Referring to the drawing and particularly to FIG. 1, the illustrated embodiment of the invention includes a polyphase welding transformer 1 providing an alternating current input to a full wave polyphase rectifier unit 2. A pair of output leads 3 and 4 are connected to the rectifier with the lead 3 shown as a positive lead and the lead 4 shown as a negative lead. The negative lead 4 is connected to a work member 5 and the positive lead 3 is connected to an electrode 6. When the power supply is energized, an arc 7 is established and maintained between the electrode 6 and the work member 5. For proper arc welding, the voltage across the electrode and the work member 5 is preset. In the illustrated embodiment of the invention, a reference voltage input 8 is connected to one side of a current feedback summing amplifier 9. The second input of the amplifier 9 is connected via current feedback unit 10 to a current sensing unit 11 connected to line respond to the current through load line 3. The output of the summing amplifier is connected as a first input to a voltage feedback summing amplifier 12. The second input of the amplifier 12 is connected to voltage sensitive leads 13 connected across the leads 3 and 4, and particularly a load resistor 13a via a voltage feedback network 14. The output of the amplifier 12 is therefore, a modified voltage signal related to the slope characteristic established by the current feedback and in turn modified by the desired voltage constant control voltage characteristics. The output of the amplifier 12 is connected to a firing circuit 15 which is interconnected to the rectifier unit 2 to produce properly timed spaced firing pulses to a plurality of triggered rectifiers for proper phasing of the rectifier network to establish and maintain the desired voltage across the electrodes 6 and the work 5. The firing circuit 15 is, in accordance with the present invention, constructed to establish firing signals of the necessary power level to positively and reliably drive the triggered rectifiers into a conducting state for conducting of the high level arc currents employed in arc welding.

A preferred construction of one embodiment of the welding circuitry particularly including a preferred firing circuit 15, is shown in FIG. 2.

Referring particularly to FIG. 2, the transformer 1 is illustrated as a three phase transformer having a six phase secondary 16 and coupled to a three phase delta-connected primary 17. The windings are suitably interconnected or coupled on a common core 18 to establish a constant potential type transformer across the leads 3 and 4. The common or star point of the secondary 16 is connected in series with a control winding 19 of a saturable reactor control unit 20 and a pair of parallel controlled resistors 21 to the work 5.

The outer end of each phase winding of the secondary 16 is similarly connected to the lead 3 by or in series with a silicon controlled rectifier. The diametrically opposite phase windings of the star connected secondary are connected by simultaneously conducting controlled rectifiers. Thus, one phase is connected by a pair of controlled rectifiers 22 to the line 3, an adjacent phase is connected by a similar pair 23 and the final pair phase are connected by a final pair 24. The paired controlled rectifiers are connected to the firing circuit for simultaneous pulsing. Thus, the portion of the half-wave of each winding applied across the leads 3 and 4 is controlled by the phased firing of the related control rectifiers 22 through 24.

The paired rectifiers are connected to corresponding portions of the firing circuit 15 of which the circuit 26 for rectifiers 22 is shown in detail. The other circuits for rectifier pairs 23 and 24 are similarly constructed and consequently are shown in appropriately labeled blocks. The firing circuit 26 is energized via an input line 27 and is connected to the output of amplifier 12 as shown in FIG. 1. The signal at line 27 determines the particular time at which a firing pulse or pulses are simultaneously applied to the rectifiers 22 and thereby determine the particular time in the phase that for the positive half cycle of the output of the secondary that the related rectifier conducts. As hereinafter described, the input to the firing circuit is synchronized with the voltage applied to the rectifiers 22 and this signal is further modified by the current feedback network 10 and the voltage feedback network 14 through summation in amplifier 9 and 12 to establish a desired constant output voltage having a predetermined slope.

In FIG. 2, the current sensing unit 11 includes a pair of windings 28 and 29 coupled to the leads from the phase winding to the anodes of rectifiers 24. The windings are connected in parallel with the output leads 30 connected to the current feedback network 10. A feedback resistor 31 is shown connected across the leads 30. The current feedback network includes a separate slope circuit 32, the output of which is interconnected into the summing amplifier 9.

The illustrated slope circuit includes a full wave bridge diode rectifier 32 connected across the leads 30 and establishing a pulsating direct current related to the current in the leads of rectifiers 24 and thus, in lead 30. The output of the rectifier is filtered by a parallel capacitor to form a filtered direct current signal which is impressed across a potentiometer 35, having a tap 36. The potentiometer further defines a voltage divider for reducing the feedback signal or adjusting the feedback signal for differences in current transformer outputs for a given input as a result of manufacturing differences and the like, such that proper maximum slope can be achieved. The tap 36 of the potentiometer and the common end of the potentiometer 35 are connected across a further voltage dividing network consisting of a pair of series connected resistors 37. The common junction of the resistors 37 is connected to a line 38 which defines a common return or ground line for the control circuit. For purposes of simplicity of illustration, the several ground connections are shown by a conventional ground symbol. In an actual construction, the several grounded terminals are interconnected by suitable conductors.

A current pickoff circuit is connected in parallel with the voltage dividing resistors 37 and includes a potentiometer 39 in series with a diode 40. The tap 41 of the potentiometer 39 thus provides a DC signal proportional to the current feedback signal. The potentiometer is connected to the feedback current line 43 to provide a current feedback signal within the amplifier as hereinafter described.

The combination of the adjustable potentiometer 39 in parallel with the voltage dividing network 37 permits both negative and positive feedback with respect to the common ground line 28. When the tap or slider 41 is forward the bottom side of the potentiometer 39 in FIG. 2, a negative feedback signal is fed to the summing amplifier 9. As the slider 39 is moved upwardly, a voltage is established at some point which is essentially at zero with respect to the common ground line 38 and a corresponding zero current feedback signal is established. Movement of the slider 39 above that point creates a positive current feedback signal at line 43.

The illustrated current feedback amplifier 9 includes a full wave bridge rectifier 44 connected to one phase of the incoming power lines via a suitable transformer 45 to provide a DC bias supply. The output of the rectifier 44 is filtered by a suitable resistor capacitor network 46 including a pair of series connected Zener diodes 47 connected directly across the filtered circuit. The junction of the Zener diode is grounded to define the common return line for the system. The Zener diode system provides a regulated positive voltage, for example 18 volts suitable for operating of the amplifier. The amplifier proper is a differential amplifier 48 including a pair of NPN transistors 49 and 50 parallel connected across the Zener diodes 47, in a well known differential amplifying circuit. A voltage dividing network including a potentiometer 51 in series with a dropping resistor 52 is connected across the Zener diodes 47. The slider or tap 53 of potentiometer 51 is connected in series with the resistor 54 to the base 55 of transistor 49. Bias circuit tends to turn on the transistor 49 and establish an output signal at its collector. The opposite or second transistor 50 of the differential amplifier 48 is connected to be energized from a summing resistor 56, the one side of which is connected via resistor 57 to the current feedback line 43. The opposite side of the summing resistor 56 is connected via a lead 58 to a remote voltage receptacle 59. Receptacle 59 is a known device with the internal receptacle connections shown by dotted line connections within the receptacle 59. The lead 60 is, in turn, connected to a slider tap of potentiometer tap 61 of an input voltage adjustment potentiometer 62 defining the input control 8 of FIG. 1. The potentiometer 62 has a one side connected in series with a diode 63 and a dropping resistor 64 to the positive side of the regulated voltage output of the rectifier 44. The opposite side of potentiometer 62 is connected through the receptacle 59 to the common ground.

Thus, in the operation of the system, the potentiometer 51 is set to establish a predetermined bias on the transistor 49. The potentiometer 62 is set to establish a predetermined voltage to the one side of the summing resistor 56. The voltage on the other side is determined by the current feedback circuit and particularly the voltage of line 43. A potentiometer tap 65 of the potentiometer 56 connects the voltage through a limiting resistor 66 to the base of the transistor 50. Thus, the voltage applied to the transistor 50 is proportional to the summation of the reference voltage established by potentiometer 62 in the algebraic sum of voltage appearing at line 43. The output of the differential amplifier which appears at a lead 67 connected to the collector of transistor 49 is therefore, directly proportional to the summation of the reference input voltage and the current feedback voltage.

The current feedback modified signal appearing at line 67 is applied to the voltage feedback network and particularly amplifier 12.

The voltage feedback system generally is similar to that of the current feedback system and includes the differential amplifier 68 connected to a regulated DC supply including a full wave bridge diode rectifier 68a connected across the output of transformer 45 and a regulating network 69. A voltage dividing potentiometer 70 is similarly connected to one transistor 71 of the differential amplifier 68 and biases transistor 71 to conduct. The opposite transistor 72 of the differential amplifier 68 is connected in a bias network to a summing resistor 73, the one side of which is connected to the current feedback line 67, the opposite side of which is connected via a resistor 74 to the voltage feedback line 13. The output of the differential amplifier 68 is taken off the collector of transistor 71 via the line 75 which is connected in common to the input lines 27, 27', and 27'' for the several firing circuits 26, 26' and 26''.

The firing circuit 26 employs a unijunction pulsing circuit 76, the input of which is coupled to a corresponding phase line through a secondary winding 78, which is wound on a corresponding phase of the primary 17 of transformer 1, and a full wave bridge rectifier 77. The output of the rectifier 77 provides a charging current to the unijunction pulsing circuit 76 which is interconnected to the signal line 27 through a two stage amplifier including transistors 79 for controlling the firing of the unijunction transistor 81, generally in a circuit similar to that shown in the Buchanan patent 3,337,769. The input transistor 79 is connected to line 27 via a series connected diode and resistor 82. The output of the unijunction transistor 81 in accordance with the present invention controls the discharging of a power pulse capacitor 83 which is connected in series with a current limiting resistor 84 directly across the output of the rectifier 77. The capacitor 83 is selected to store a selected charge for positively firing the related power rectifiers, as follows. A silicon controlled rectifier 85 in series with a signal resistor 86 is connected across the capacitor 83. The output of the unijunction transistor 81 is connected via a signal line 87 to The gate 87a of the controlled rectifier 85. Between the firing periods of the unijunction transistor 81, the capacitor 83 is charged from the rectifier 77 to a selected level. When a firing pulse is established by the firing of unijunction transistor 81, the controlled rectifier 85 is fired and rapidly discharges capacitor 83 through resistor 86 and thereby generates a corresponding voltage across the resistor.

A pair of resistors 88 and 89 are connected in common at one end to the junction of the controlled rectifier 85 and the resistor 86 with the opposite ends connected respectively to the gates of the two controlled rectifiers 22 in the main or power rectifier unit 2.

The capacitor 83 provides a source of relative substantial voltage which can be rapidly discharged through the gate circuits of a pair of the power controlled rectifiers 22—24. This establishes an amplified power pulse for positively driving the rectifiers 22—24 into conduction and permitting welding at relatively large arc current. The unijunction oscillator need only drive the small pilot controlled rectifier 85. In a practical application of a 600 ampere welding supply, the capacitor 83 was selected to establish an open circuit firing voltage of 20 volts and a short circuit current capability of 1.2 amperes.

In accordance with a further significant feature of the present invention, the first stage amplifying transistor 79 is connected to the output of the supply rectifier 77 in a common emitter configuration. The emitter 90 of the transistor 79 is connected to ground in series with a fixed resistor 90a and a small trim potentiometer 91. The firing circuit 26 may conveniently be a printed circuit board employing a screw driven adjustment trim potentiometer 91. This permits safe and convenient adjustment of the unijunction circuit to properly and evenly balance the load current between the several power controlled rectifiers 22—24 and thereby prevent destruction of a rectifier as a result of overload.

The operation of the illustrated embodiment of the invention shown in FIG. 2 may therefore be briefly summarized as follows.

The main power supply connection is completed through any suitable means to energize the main transformer 1 and thereby establish the alternating current output of the secondary 16, the proportion of which is applied across the lines 3 and 4 in accordance with the firing of the controlled rectifiers 22 through 24 inclusive.

The particular firing point is controlled by the firing of the circuits 26 and in particular, the discharge of the related capacitors 83 which in turn is controlled by producing proper voltage signals at lines 27, 27' and 27'' and in accordance with the setting of the trim potentiometers 91. The unijunction circuit 76 produces time spaced firing signals in accordance with the input of potentiometer 62 and the current and voltage feedback. The charging period of the capacitor 83 is less than the pulse repetition and is fully charged between firing signals. When a firing signal is received, the pilot controlled rectifier 85 is fired to discharge the capacitor 83 and establish a hard firing pulse via the coupling resistors 88 and 89 to the proper pair of power controlled rectifiers 22—24.

This system provides a reliable and repeatable firing of the rectifiers 22—24, inclusive, for carrying of the very substantial arc currents with a minimum possibility of failure.

We claim:

1. A direct current arc power supply for establishing and maintaining an arc between a pair of electrode members, comprising a pair of electrode connecting terminals, a plurality of solid state triggered rectifier means connecting an alternating current input to a set of direct current output leads connected to said terminals for supplying the arc voltage and current to establish and maintain an arc, control means to establish a control signal for adjusting the arc current, a pulse forming means connected to said control means and establishing a train of time spaced pulses for controlling said rectifier means in accordance with the control signal, a discharge circuit including an energy storage means and a triggered electronic switch means, said triggered electronic switch means having an input means connected to said pulse forming means, and means connecting said triggered rectifier means to said discharge circuit to control the conduction of said rectifier means.

2. The arc power supply of claim 1 wherein said rectifier means including a plurality of paralleled rectifying means and said pulse forming means includes a unijunction transistor connected in a pulse forming circuit, an amplifying means having an input control signal means and connected to the unijunction transistor to control the firing point thereof, said amplifying means including a transistor with a bias circuit including a fixed resistor in series with a small potentiometer for varying the firing point thereof and thereby balancing the current through the paralleled triggered rectifying means.

3. The direct current arc power supply of claim 1 wherein said pulse forming means includes a unijunction transistor oscillator coupled to said alternating current input by a full wave rectifier means and a transformer means, said energy storage means being a capacitor connected in a charging circuit across said full wave rectifier means.

4. The direct current arc power supply of claim 3 having a voltage sensitive regulating device in parallel with the oscillator and a second voltage sensitive regulating device in parallel with the capacitor.

5. The arc power supply of claim 1 wherein said input includes a polyphase transformer means having a plurality of secondary phase windings, said triggered rectifier means including individual rectifying means connected one each in series with each phase winding and defining said pair of direct current output leads, said energy storage means including a storage capacitor means connected in parallel with the pulse forming means, said triggered electronic switch means being connected in series with a signal impedance in parallel with said capacitor means, a connection means connected to the input means of the triggered rectifier means and to the connection of said triggered electronic switch means and said signal impedance.

6. The direct current arc power supply of claim 1 wherein said rectifier means is a full wave three phase rectifier network having a pair of controlled rectifiers in each phase of the network, a three-phase input transformer connected to said rectifier network, said pulse forming means including three firing circuits one for each phase, each of said firing circuits including a related phase winding coupled to the corresponding primary phase of the input transformer and to a single phase full wave rectifier, a unijunction oscillator connected to said related phase winding and to said control circuit means, said energy storage means being a capacitor connected across the single phase full wave rectifier, said triggered electronic switch being a controlled rectifier and connected in series with an output resistor across said capacitor, the junction of said last named controlled rectifier and output resistor being connected to a pair of said controlled rectifiers in said rectifier network.

7. The direct current arc power supply of claim 6 having a Zener diode connected across the full wave rectifier to supply a regulated voltage to the oscillator, and a Zener diode connected across the capacitor to charge the capacitor to a selected voltage.